United States Patent
Mannepally

(10) Patent No.: US 9,756,499 B2
(45) Date of Patent: Sep. 5, 2017

(54) SYSTEM AND METHOD FOR TERMINATING COMMUNICATION SESSIONS WITH ROAMING MOBILE DEVICES

(71) Applicant: T-Mobile USA, Inc., Bellevue, WA (US)

(72) Inventor: Sasikala Mannepally, Bothell, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 14/987,652

(22) Filed: Jan. 4, 2016

(65) Prior Publication Data
US 2016/0198335 A1 Jul. 7, 2016

Related U.S. Application Data

(60) Continuation of application No. 14/252,707, filed on Apr. 14, 2014, now Pat. No. 9,232,386, which is a (Continued)

(51) Int. Cl.
*H04W 4/00* (2009.01)
*H04W 8/04* (2009.01)
(Continued)

(52) U.S. Cl.
CPC ............. *H04W 8/04* (2013.01); *H04W 8/06* (2013.01); *H04W 64/003* (2013.01);
(Continued)

(58) Field of Classification Search
CPC ........... H04W 8/04; H04W 8/06; H04W 8/12; H04W 60/00; H04W 64/003; H04W 88/16
(Continued)

(56) References Cited

U.S. PATENT DOCUMENTS 7,218,952 B1 * 5/2007 Alperovich ....... H04M 3/42153
370/329
7,353,278 B2 * 4/2008 Tuunanen ............... H04L 12/58
370/331

(Continued)

FOREIGN PATENT DOCUMENTS

| KR | 20100085952 | 7/2010 |
|---|---|---|
| WO | 2013134318 | 9/2013 |

OTHER PUBLICATIONS

International Searching Authority, International Search Report and Written Opinion, PCT Application PCT/US2013/029207, mailed Jul. 10, 2013, 14 pages.

*Primary Examiner* — Khai M Nguyen
(74) *Attorney, Agent, or Firm* — Perkins Coie LLP

(57) ABSTRACT

A system and method to assist in establishing a communication session to a mobile device having a registered IMS session in a visited network, or having both a registered IMS session and a circuit-switched session in a visited network. When a mobile device establishes an IMS session with an application service in a visited network, the address of the application service and the identity of the mobile device is transmitted to the Home Location Register (HLR) and/or Home Subscriber Server (HSS) associated with the mobile device. The HLR or HSS stores the address of the application service in conjunction with the identity of the mobile device. When requests to establish a communication session with the mobile device are made, the HLR or HSS provides the address of the application service that is associated with the mobile device in the visited network to allow a communication session to be established.

20 Claims, 6 Drawing Sheets

Related U.S. Application Data division of application No. 13/412,528, filed on Mar. 5, 2012, now Pat. No. 8,712,409.

(51) Int. Cl.
*H04W 8/06* (2009.01)
*H04W 80/00* (2009.01)
*H04W 64/00* (2009.01)
*H04W 8/12* (2009.01)
*H04W 88/16* (2009.01)

(52) U.S. Cl.
CPC .............. *H04W 80/00* (2013.01); *H04W 8/12* (2013.01); *H04W 88/16* (2013.01)

(58) Field of Classification Search
USPC ...... 455/433, 417, 414.1, 435.1, 445, 552.1; 370/353, 352, 355, 356, 354
See application file for complete search history.

(56) References Cited

U.S. PATENT DOCUMENTS

| | | | | |
|---|---|---|---|---|
| 7,881,288 B2 * | 2/2011 | Noldus | ................ | H04W 8/082 370/353 |
| 8,090,344 B2 * | 1/2012 | Hamadi | ................ | H04M 15/80 455/405 |
| 8,229,408 B2 * | 7/2012 | Keller | .................... | H04W 4/16 370/338 |
| 8,260,290 B2 | 9/2012 | Pressley et al. | | |
| 8,694,009 B2 * | 4/2014 | Noldus | .................... | H04W 8/12 455/417 |
| 8,712,409 B2 | 4/2014 | Mannepally | | |
| 9,113,334 B2 * | 8/2015 | Agarwal | ................ | H04W 12/08 |
| 9,232,386 B2 | 1/2016 | Mannepally | | |
| 2006/0276226 A1 * | 12/2006 | Jiang | ..................... | H04W 8/183 455/558 |
| 2007/0123277 A1 * | 5/2007 | Harris | ..................... | H04W 4/14 455/466 |
| 2007/0197212 A1 * | 8/2007 | Marsico | .................. | H04W 4/16 455/433 |
| 2008/0064369 A1 | 3/2008 | Xie et al. | | |
| 2008/0117893 A1 * | 5/2008 | Witzel | ................. | H04W 80/10 370/352 |
| 2008/0232352 A1 | 9/2008 | Terrill et al. | | |
| 2010/0304705 A1 | 12/2010 | Hursey | | |
| 2011/0081907 A1 | 4/2011 | Yang et al. | | |
| 2011/0134843 A1 | 6/2011 | Noldus et al. | | |
| 2011/0300862 A1 | 12/2011 | Munoz et al. | | |
| 2013/0288671 A1 | 10/2013 | Keller et al. | | |
| 2013/0308632 A1 | 11/2013 | Keller et al. | | |

\* cited by examiner

SYSTEM AND METHOD FOR TERMINATING COMMUNICATION SESSIONS WITH ROAMING MOBILE DEVICES

CROSS-REFERENCES TO RELATED APPLICATIONS

This application is a continuation application of U.S. patent application Ser. No. 14/252,707, filed on Apr. 14, 2014, and entitled SYSTEM AND METHOD FOR TERMINATING COMMUNICATION SESSIONS WITH ROAMING MOBILE DEVICES, which is a divisional application of U.S. patent application Ser. No. 13/412,538, filed on Mar. 5, 2012, now U.S. Pat. No. 8,712,409, and entitled SYSTEM AND METHOD FOR TERMINATING COMMUNICATION SESSIONS WITH ROAMING MOBILE DEVICES," which is hereby incorporated herein in its entirety by reference.

BACKGROUND

The IP Multimedia Subsystem (IMS) is an architectural framework for delivering internet protocol (IP) multimedia to mobile users over various types of wireless and fixed networks. Through advancements in wireless access technologies, IP based communications for multimedia application services became available for various types of mobile devices. Subscribers of second and third generation mobile communication networks are offered application services which require access to special network subsystems such as the IMS. Examples of such application services include white board discussions, video conferencing, Push to talk over Cellular (PoC), Voice over IP (VoIP), real-time content sharing including video/audio files, instant messaging, interactive gaming, and the like. One of the challenges posed by IP multimedia application services is to provide a good user experience with media application services across a variety of computing and mobile devices running over diverse networks (e.g., different types of wireless networks, fixed networks, or the like).

As a mobile device roams beyond its home network, it may seek to access application services in other networks that it visits. For example, a mobile device in a cellular network may seek to access video chat application services delivered via the IMS. To enable roaming, communication networks must therefore identify and register home and visiting devices accessing the resources of the network. For example, a visiting network typically allows visiting mobile devices to establish IMS sessions. To access the IMS, mobile devices use a subscription provided by the home network of the mobile device. Once the mobile device visits a network, a registration procedure is initiated. To register with the visited network, the mobile device transmits a Uniform Resource Indicator (URI) that identifies the home network of the mobile device so that the subscription can be verified. Within the visited network, the Home Subscriber Server (HSS) manages the subscriptions of home and visiting subscribers.

Determining how to allow roaming access to IMS application services is a challenging problem for the telecommunications industry. At present, the 3rd Generation Partnership Project (3GPP) working group proposal is to maintain the location and address of each mobile device at each switch within the IP network. However, this solution requires significant network resources. In particular, the distributed method proposed by 3GPP requires the propagation of the mobile device addresses throughout the network, which is obviously expensive from a bandwidth/time perspective. An alternative solution that reduces the numerous data calls and messaging of the 3GPP proposal is therefore desired.

DETAILED DESCRIPTION

A system and method to aid in establishing a communication session to a mobile device having a registered IMS session in a visited network, or having both a registered IMS session and a circuit-switched session in a visited network, is disclosed herein. When a mobile device establishes an IMS session with an application service in a visited network, the address of the application service and the identity of the mobile device is transmitted to the Home Location Register (HLR) and/or Home Subscriber Server (HSS) associated with the mobile device. The HLR or HSS stores the address of the application service in conjunction with the identity of the mobile device. When subsequent requests to establish a communication session with the mobile device are made, the HLR or HSS is able to provide the address of the application service that is associated with the mobile device in the visited network. The address of the application service allows a communication session to be efficiently established with the terminating mobile device while the mobile device is operating in the IMS domain of the visited network. The disclosed system and method reduces the amount of network traffic necessary to maintain accurate routing information to roaming mobile devices.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
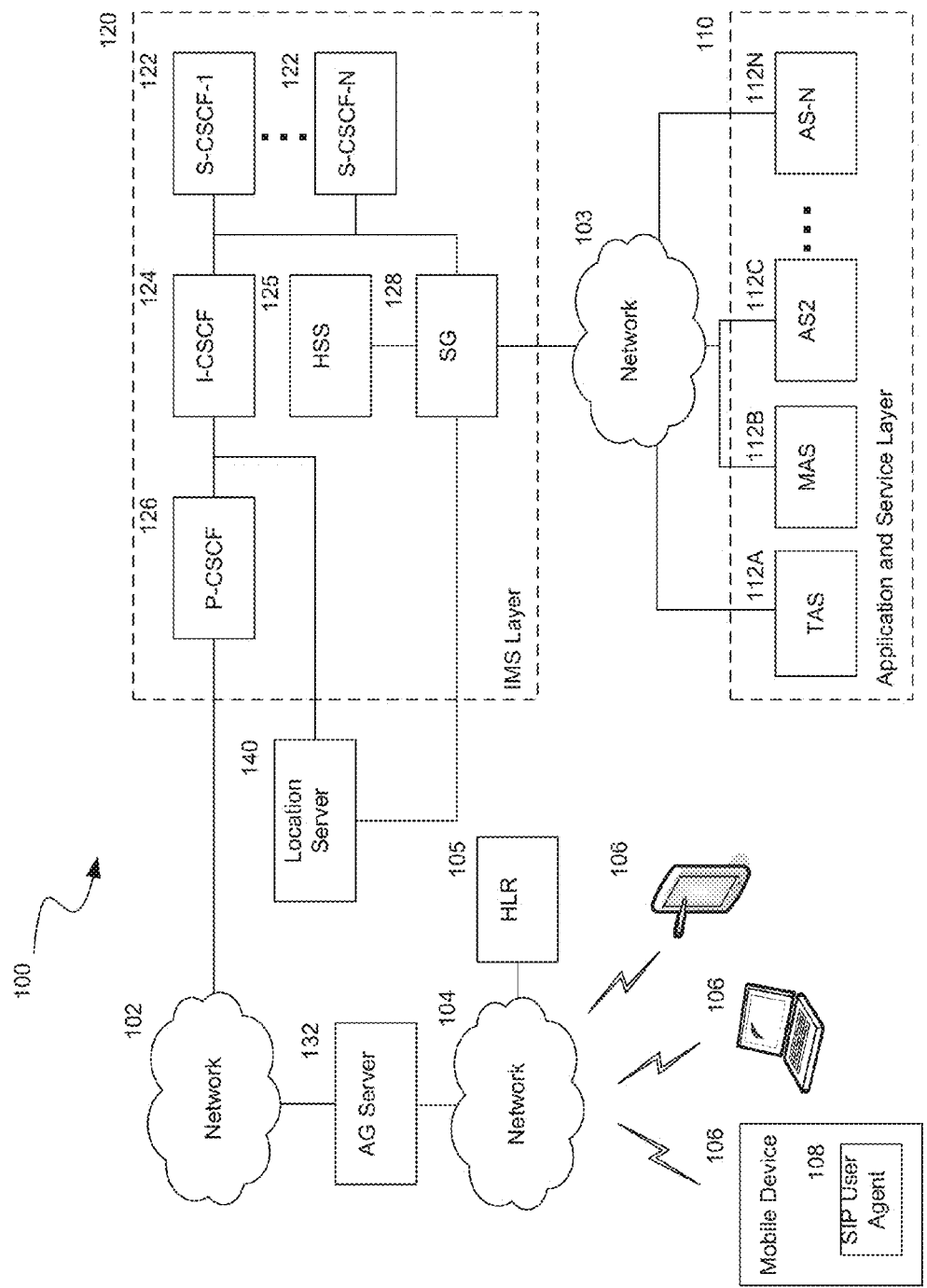
FIG. 1 is a block diagram that illustrates an exemplary IP Multimedia Subsystem (IMS) over which application services may be accessed.

FIG. 1 is a block diagram that illustrates an exemplary IP Multimedia Subsystem (IMS) network over which traffic may be routed between IMS and non-IMS networks. In particular, voice and messaging traffic may be routed between mobile devices 106 and Application Services (AS) 112, such as a Telephony Application Server (TAS) 112A and/or a Multimedia Application Server (MAS) 112B. FIG. 1 is intended to provide a general overview of a network environment 100 where embodiments of the disclosed technology may be implemented.

As shown in FIG. 1, the network environment 100 includes an Application and Service Layer 110, an IMS Layer 120, and one or more access gateway servers 132. The network environment 100 further includes one or more networks 102, 103, and 104 such as IP and telephony core networks as generally defined by 3GPP and 3GPP2 standards and organizations based on IETF Internet protocols. The networks 102, 103, and 104 may be any kind of wired or wireless network, such as 2G, 3G, 4G, WiFi, WiMax, etc. or other types of Circuit-Switched (CS) or Packet-Switched (PS) networks. The networks 102, 103, and 104 include elements to manage subscriber subscriptions. For example, network 104 may be a GSM network that includes a Home Location Register (HLR) 105 to store subscriber subscription information and perform authentication and authorization functions. The networks 102, 103, and 104 also include elements to perform switching functions. For example, network 104 may be a GSM network that includes a Gateway Mobile Switching Center (GMSC) (not shown). The network environment 100 depicted in FIG. 1 has been simplified for purposes of highlighting the disclosed technology, and one skilled in the art will appreciate that additional components may be utilized within the various depicted layers.

The IMS layer 120 includes several types of IMS servers. IP based networks frequently use the Session Initiation Protocol (SIP) and Session Description Protocol (SDP) for session management. In general, the IMS layer 120 carries out the primary SIP signaling functions in the IMS core network. The IMS servers may include a Proxy CSCF (P-CSCF) 126 which is the first point of contact for mobile devices in a visiting network. The P-CSCF routes communications to a visited IMS network, an Interrogating-CSCF (I-CSCF) 124 which is the entry point of the mobile device's domain (e.g., the visited network where the I-CSCF is located), and one or more Serving-CSCFs (S-CSCFs) 122 which manage session control functions, and the like.

Mobile devices 106 may roam onto visiting networks and establish IMS sessions in order to communicate with other users via IP-based voice and messaging applications. A mobile device 106 equipped with a SIP user agent can employ a Uniform Resource Indicator (URI) to register an IMS session at the visited network. Alternatively, a mobile device 106 not equipped with a SIP user agent can employ another identifier associated with the mobile device (e.g., the Mobile Subscriber ISDN Number (MSISDN) of the mobile device) to establish an IMS session. In the latter case, the S-CSCF 122 assigns a third party registration to the roaming mobile device 106. Using either type of identifier, the mobile device 106 is allowed to establish IMS sessions in a visited network.

By way of example, when a mobile device 106 transmits a registration request, the P-CSCF 126 forwards the request to an I-CSCF 124 of the visited IMS network, which determines a S-CSCF 122 responsible for delivering the services to the mobile device subscriber or end user. The registration request can be made using SIP or another protocol. The S-CSCF executes comprehensive session control based on the services of the mobile device user (the requesting party) and the terminating party. In the event that the registration request is a non-SIP type request, the S-CSCF 122 assigns a third party registration to the roaming mobile device 106.

The IMS Layer 120 also includes a services gateway (SG) 128. The SG 128 maintains the trigger points (TP) of services and pointers to application services 112 where specific application service logic resides. The S-CSCF 122 communicates with the SG 128 to determine the appropriate application service to access and provide requested application services to a mobile device.

The IMS layer 120 provides a horizontal control layer that isolates the access network from the Application and Service Layer 110. Generally, the application and service layer 110 does not need to have its own control functions, as the IMS layer 120 provides those control functions. Separating application services into an application and service layer 110 allows third party service providers to easily integrate and deploy services on the IMS infrastructure.

The Application and Service Layer 110 includes one or more application services (AS) 112. The application services 112 are implemented on one or more servers that host and execute particular applications, such as telephony applications, e-commerce applications, mobile gaming applications, location-based service applications, and enterprise applications (e.g., enterprise resource planning software (ERP), customer relationship management software (CRM) and supply chain management (SCM) applications). In order to enable location-based application services, a location server 140 may maintain geographic information that is associated with mobile devices that access the IMS core network. For example, the location server 140 may maintain a record of current or past locations of a mobile device 106, such as the latitude and longitude of the mobile device. Such location information may be used by the application services to provide robust location-based services to mobile devices.

The application services 112 may include one or more Telephony Application Servers (TAS) 112A. TAS 112A is connected to the CSCFs through the SG 128. TAS 112A is a SIP user agent that provides call services such as routing, call setup, call termination, call waiting, teleconferencing, etc. TAS 112A is accessed by mobile device 106 via the IMS layer 120 using SIP messaging in the IMS. Although the TAS 112A is accessed using SIP, the mobile device 106 need not include a SIP agent.

The application services 112 may also include one or more Multimedia Application Servers (MAS) 112B. MAS 112B is connected to the CSCFs through the SG 128. TAS 112B is a SIP user agent that provides text and multimedia messaging services. For example picture and video messages may be routed through the MAS 112B. MAS 112B is accessed by mobile device 106 via the IMS layer 120 using SIP messaging in the IMS. Although the MAS 112B is accessed using SIP, the mobile device 106 need not include a SIP agent.

Application services 112, such as the TAS 112A and MAS 1126, are able to exchange messages with HSS 125 and HLR 105 using a communication protocol. Application services 112 may use a mobile application part (MAP) interface of the SS7 protocol to communicate with the HLR 105 and may use a Diameter Sh interface to communicate with the HSS 125.

In addition, the SG 128 may also control access to application services based on the identity of the requesting mobile device. To perform access control, the SG 128 may access a HSS 125 that contains subscriber- or user-specific data, including, but not limited to, user authorizations, service permissions, user profiles, user preferences, etc. The HSS 125 may contain a mapping of a unique identifier associated with a mobile device, such as a Mobile Subscriber ISDN Number (MSISDN), and a set of authorized application services that may be accessed by that mobile device. The HSS 125 may alternatively or in addition contain a mapping of those application services to which access is expressly denied to a mobile device. When requests to access a particular application service are received by the SG 128, the SG consults the HSS 125 to determine whether the access is authorized. The SG 128 allows the mobile device to access those services that are authorized, while the SG 128 denies access by the mobile device to those services that are not authorized. The service provider for a mobile device may define the access rules that are implemented by the SG 128, such as by limiting access based on outstanding account balance, conformance with a service plan, parental restrictions, features of the mobile device supported or not supported by the requested application service, etc.

It will be appreciated that the network environment 100 may include one or more networks that correspond to a number of IP-based and other networks such as the Internet, DSL networks, public switched telephone networks ("PSTN") and other wire-line networks (e.g., SS7-based networks), wireless networks such as those using CDMA, GSM, IEEE 802.11x, and/or UMTS communications or the like, and local area networks. For example, the IP-core network 102 may be interfaced with other networks 104 through an access gateway server 132. An access gateway server 132 may include a Gateway GPRS Support Node (GGSN) for General Packet Radio Service (GPRS), a Packet Data Gateway (PDG) for WiFi, Systems Architecture Evolution Gateway (SAE-GW) or a Packet Data Network Gateway (PDN-GW) for 3GPP Long Term Evolution (LTE), and the like.

Mobile devices 106 are electronic devices capable of communicating with one another over the network(s) in the network environment 100. The mobile devices 106 are wireless devices with high-speed data transfer capabilities, such as those compliant with 3G or 4G standards, and the like. As will be appreciated by one skilled in the art, the mobile devices 106 may include a variety of configurations or forms such as, but not limited to, laptop or tablet computers, personal digital assistants (PDAs), hybrid PDA/mobile phones, mobile phones, smart phones, media players, mobile messaging devices, portable gaming devices, home messaging hub devices, digital picture frame devices, and the like.

Further, as will be appreciated by one skilled in the art, the mobile devices 106 communicate with one another over the networks in a standard manner, depending on the particular networks used and the particular type of mobile device. Each mobile device may operate in communications frequency bands such as the cellular telephone bands at 850 MHz, 900 MHz, 1800 MHz, and 1900 MHz, the global positioning system (GPS) band, data service bands such as the 3G data communications band (e.g., the Universal Mobile Telecommunications System (UMTS) communication band), the WiFi (IEEE 802.11) band, the Bluetooth band and the like. The mobile device may include circuitries that are required to support one or more of following: the General Packet Radio Service (GPRS) standard, Enhanced Digital GSM Evolution (EDGE), or Evolution of GSM (E-GSM) standard, Code Division Multiple Access (CDMA) standard, Wideband Code Division Multiple Access (WCDMA or W-CDMA) standard, Orthogonal Frequency Division Multiplex (OFDM) standard, Time Division Multiple Access (TDMA) standard, and the other standards.

Figure 2:
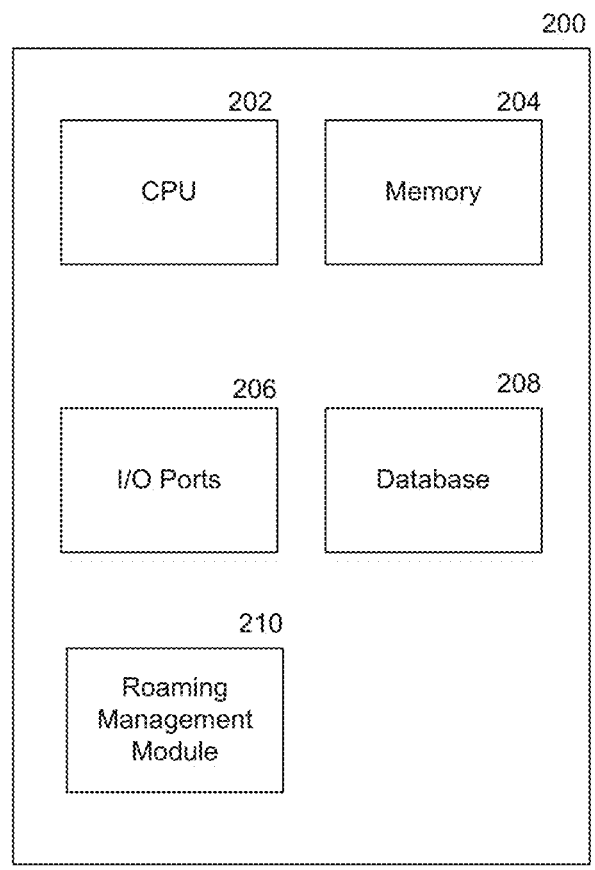
FIG. 2 is a block diagram that illustrates an exemplary home device that facilitates call termination to mobile devices with IMS sessions in visited networks.

FIG. 2 is a block diagram that illustrates an exemplary home database (HD), such as incorporated in a HLR 105 or HSS 125, that facilitates call termination to mobile devices with IMS sessions in visiting networks. As shown in FIG. 2, the HD 200 includes a central processing unit (CPU) 202, memory 204, input/output ports 206, database 208, and roaming management module 210. The components of the HD 200 may communicate with one another using one or more communication protocols and/or local communication buses.

The database 208 of HD 200 may contain subscriber- or user-specific data, including, but not limited to, user authorizations, service permissions, user profiles, user preferences, a mapping of a unique identifier associated with a mobile device to a set of authorized application services that may be accessed by that mobile device, etc. For example, each mobile device may be identified by a Mobile Subscriber ISDN Number (MSISDN), and each mobile device associated with a set of authorized application services.

Moreover, as will be described in additional detail herein, database 208 may also include data which represents recent application services used by a mobile device during an IMS session in a visited network. The roaming management module 210 receives a SRI message from the input/output ports 206. The roaming management module 210 accesses the database 208 to identify an application service 112 that has been utilized by the mobile device in the visited network. If an application service is indicated as being associated with the terminating mobile device, the roaming management module 210 uses the address of the application service to obtain a roaming number associated with the mobile device. The roaming number may then be used to establish a communication session with the mobile device.

The HD 200 communicates with the SG 128 and/or GMSC through input/output ports 204. As discussed above, the input/output ports communicate using communication protocols such as MAP and Sh interfaces. The functions of the HD 200 are then executed by the CPU 202 which is coupled to memory 204.

Figure 3:
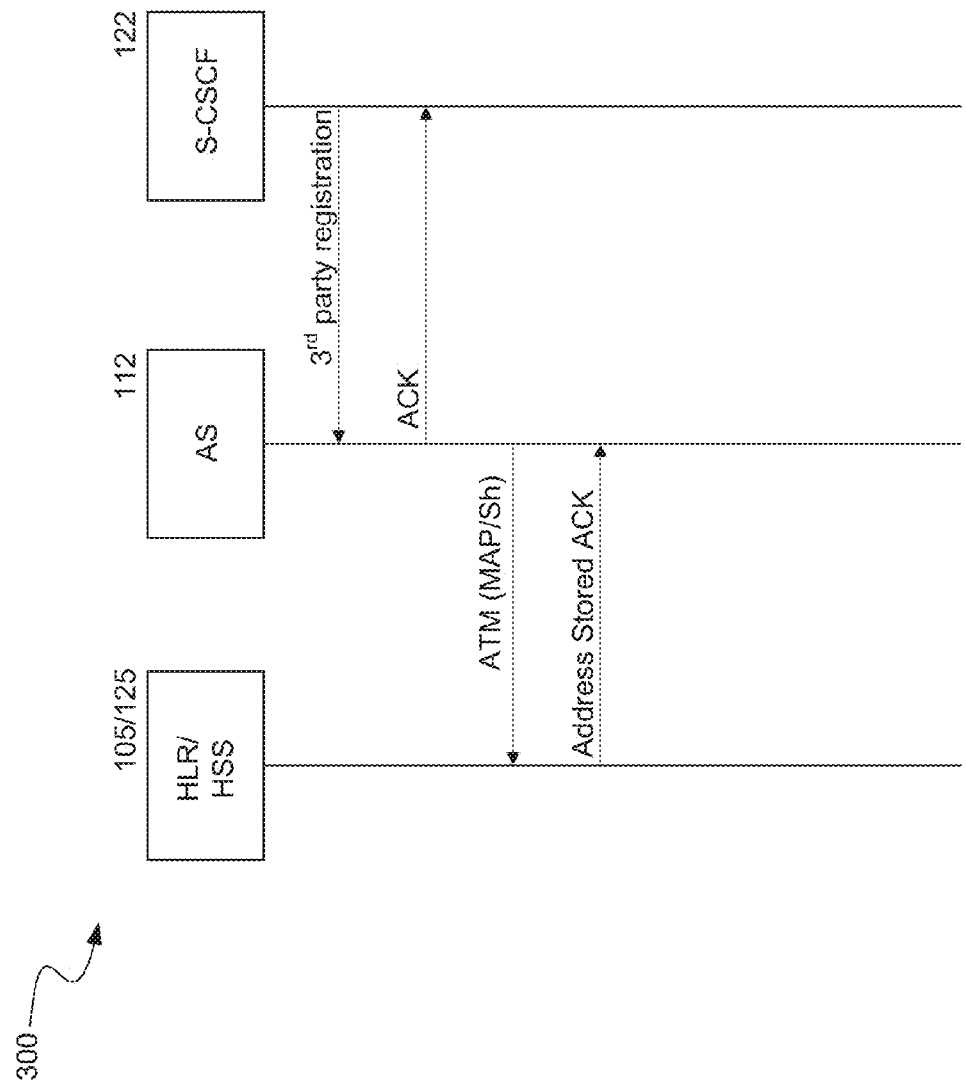
FIG. 3 is a signaling diagram that illustrates representative messaging used to register an application service utilized by a mobile device while in a visited cellular network.

FIG. 3 is a signaling diagram 300 that illustrates representative messaging used to register a mobile device with the IMS while the device is roaming on a visited cellular network. At the outset, the mobile device submits a SIP registration request with the S-CSCF 122 in order to establish an IMS session. The S-CSCF routes requests for services to appropriate application services (AS) 112, such as TAS 112A or MAS 112B. Upon receipt of the third party registration request, the application service 112 transmits an acknowledgement confirming registration to the S-CSCF. To enable subsequent termination of incoming communications with the mobile device, the application service 112 also sends an Asynchronous Transfer Message (ATM) to the HLR 105 and/or the HSS 125 of the cellular network 104. The ATM includes the address of the application service 112 that is associated with the registered session of the mobile device as well as an identifier associated with the mobile device. The application service 112 may utilize a MAP interface with the HLR 105 or a Diameter Sh interface with the HSS 125 in order to send the address and identifier information. The HLR/HSS stores the address of the application service 112 and the identifier of the mobile device so that a subsequent request for a communication session can be efficiently established with the mobile device while the mobile device is operating in the IMS domain of the visited network. Upon storing the address of the application service in conjunction with an identification of the mobile device, the HLR/HSS transmits an "address stored" acknowledgement to the application service 112. If an appropriate ACK is not received from the HLR/HSS within a requisite period, the application service 112 may re-transmit the address information until confirmation of storage is received.

In some embodiments, the S-CSCF 122 also provides an indication to the application service 112 when the mobile device being registered also has an established circuit-switched connection with the visiting network. If the application service 112 receives an indication that the mobile device also has a circuit-switched connection, the existence of that connection is also transmitted to the HLR 105 or HSS 125. The HLR 105 or HSS 125 stores the information reflecting the existence of the circuit-switched connection in conjunction with the mobile device identifier.

Figure 4:
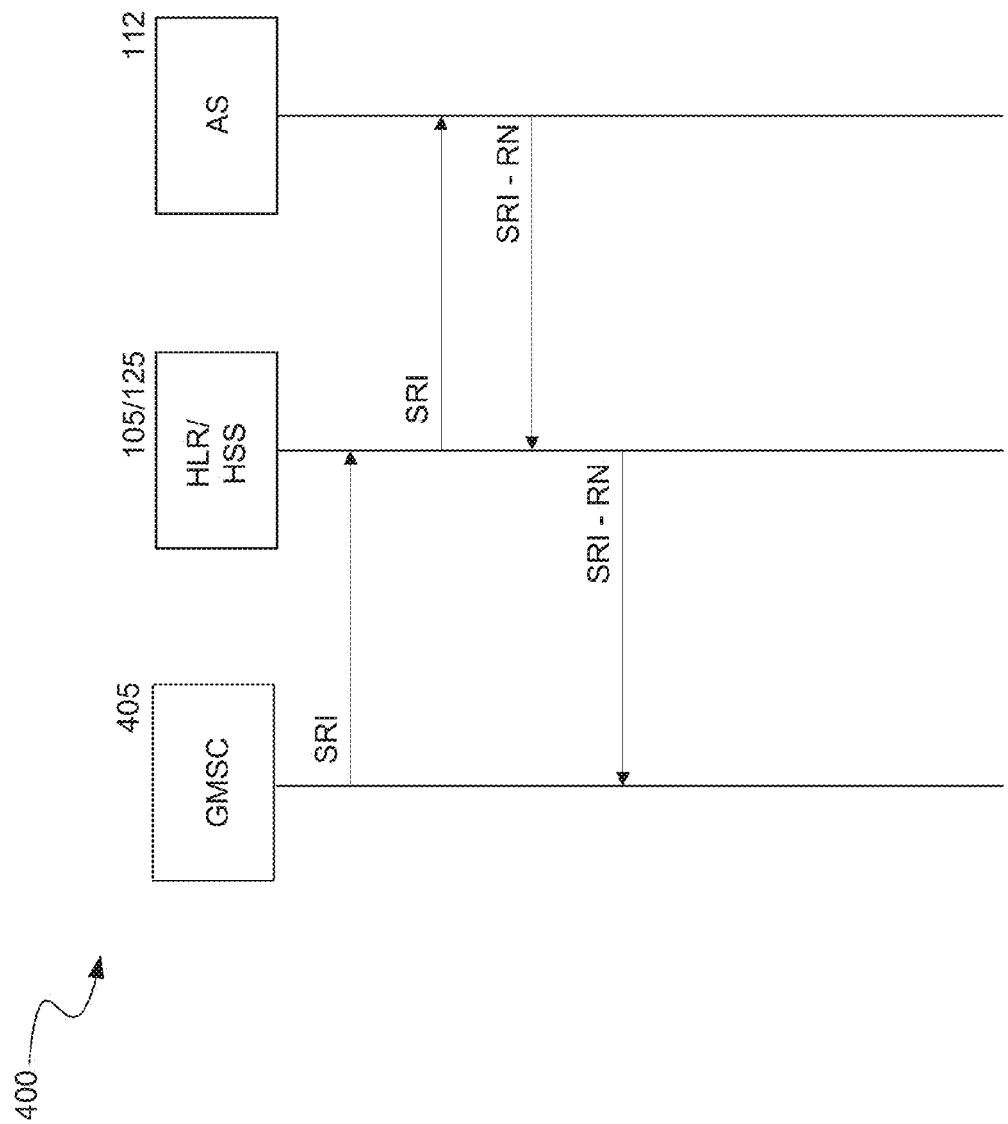
FIG. 4 is a signaling diagram that illustrates representative messaging used to establish a communication session with a mobile device having a registered IMS session in a visited network.

FIG. 4 is a signaling diagram 400 that illustrates representative messaging used to establish a communication session with a mobile device having a registered session with an application service 112 in a visited network. Under prior proposals, maintaining the information necessary to terminate a communication session with a mobile device 106 in a visited cellular network was a costly proposition in terms of the addressing information that needed to be distributed throughout the network. In contrast, by storing addresses of the application service 112 at the HLR 105 and/or HSS 125, terminating connections at mobile devices in visited networks can be more quickly and easily established. When a communication session is to be established with a mobile device in a visited network, the Gateway MSC (GMSC) 405 of a home cellular network transmits a Send Routing Information (SRI) message to the HLR 105 or HSS 125. The HLR 105 or HSS 125 checks the SRI message to determine whether the call is associated with a mobile device that has a registered session with an application service 112. If the communication request is associated with a mobile device having a registered session, the SRI message is routed to the appropriate application service 112, such as TAS 112A or MAS 112B. Otherwise, if the HLR 105 or HSS 125 cannot associate the incoming SRI message with an application service 112, an indication is provided to the requesting mobile device that a communication session cannot be established with the desired terminating mobile device.

After receiving the SRI message, the application service 112 responds with an IMS Roaming Number (RN) that is assigned to the terminating mobile device 106. The IMS RN is transmitted to the HLR/HLS and routed to the GMSC. The GMSC utilizes the roaming number to allow a communication session to be established between the requesting mobile device and the terminating mobile device.

Figure 5:
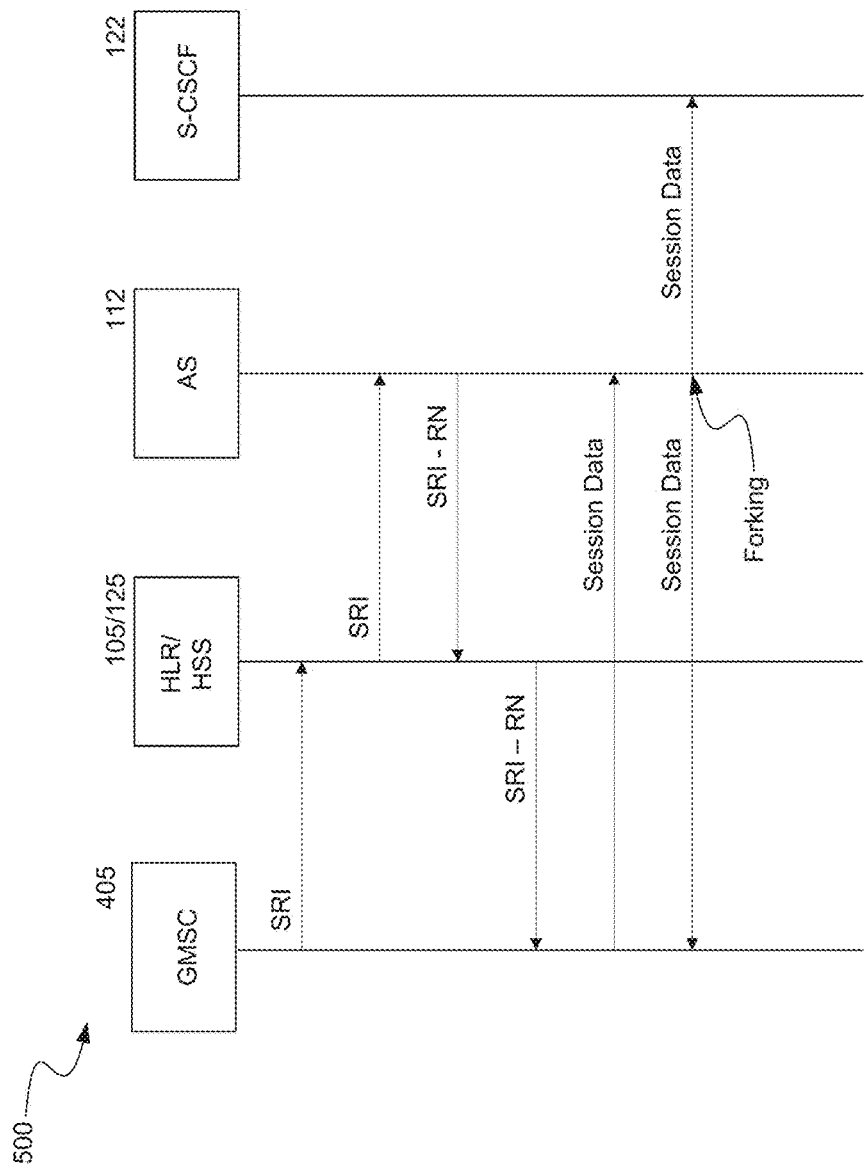
FIG. 5 is a signaling diagram that illustrates representative messaging used to establish communication sessions with a mobile device having a registered IMS session and also a circuit-switched connection in a visited network.

FIG. 5 is a signaling diagram 500 that illustrates representative messaging used to establish a communication session with a mobile device having a registered IMS session and also a circuit-switched connection in a visited network (e.g., in circumstances when a mobile device has an HSPA+ connection and is using a circuit-switched connection for voice calls and an IMS connection for video calls). When a communication session is to be established with a mobile device in a visited network, the Gateway MSC (GMSC) of a home cellular network transmits a Send Routing Information (SRI) message to the HLR 105 or HSS 125. The HLR 105 or HSS 125 checks the SRI message to determine whether the call is associated with a mobile device that has a registered session with an application service 112. Moreover, the HLR 105 or HSS 125 also checks to see if the desired terminating mobile device also has a registered circuit-switched session on the visiting network. If the communication request is associated with a mobile device having a registered session, the SRI message is routed to the appropriate application service 112, such as TAS 112A or MAS 112B. Otherwise, if the HLR 105 or HSS 125 cannot associate the incoming SRI message with an application service 112, an indication is provided to the requesting mobile device that a communication session cannot be established with the desired terminating mobile device. When routing to the appropriate application service 112, HLR or HSS also sets an additional parameter indicating that the terminating mobile device is registered in both the IMS and circuit-switched domains.

After receiving the SRI message, the application service 112 responds with an IMS Roaming Number (RN) that is assigned to the terminating mobile device 106. The IMS RN is transmitted to the HLR/HLS and routed to the GMSC. The GMSC utilizes the roaming number to allow a communication session to be established between the requesting mobile device and the terminating mobile device. Depending on the type of communication session that is established with the terminating mobile device, the application service 112 may implement forking of the received data in order to enable aspects of the communication session to be implemented in both the IMS and the circuit-switched domains.

Figure 6:
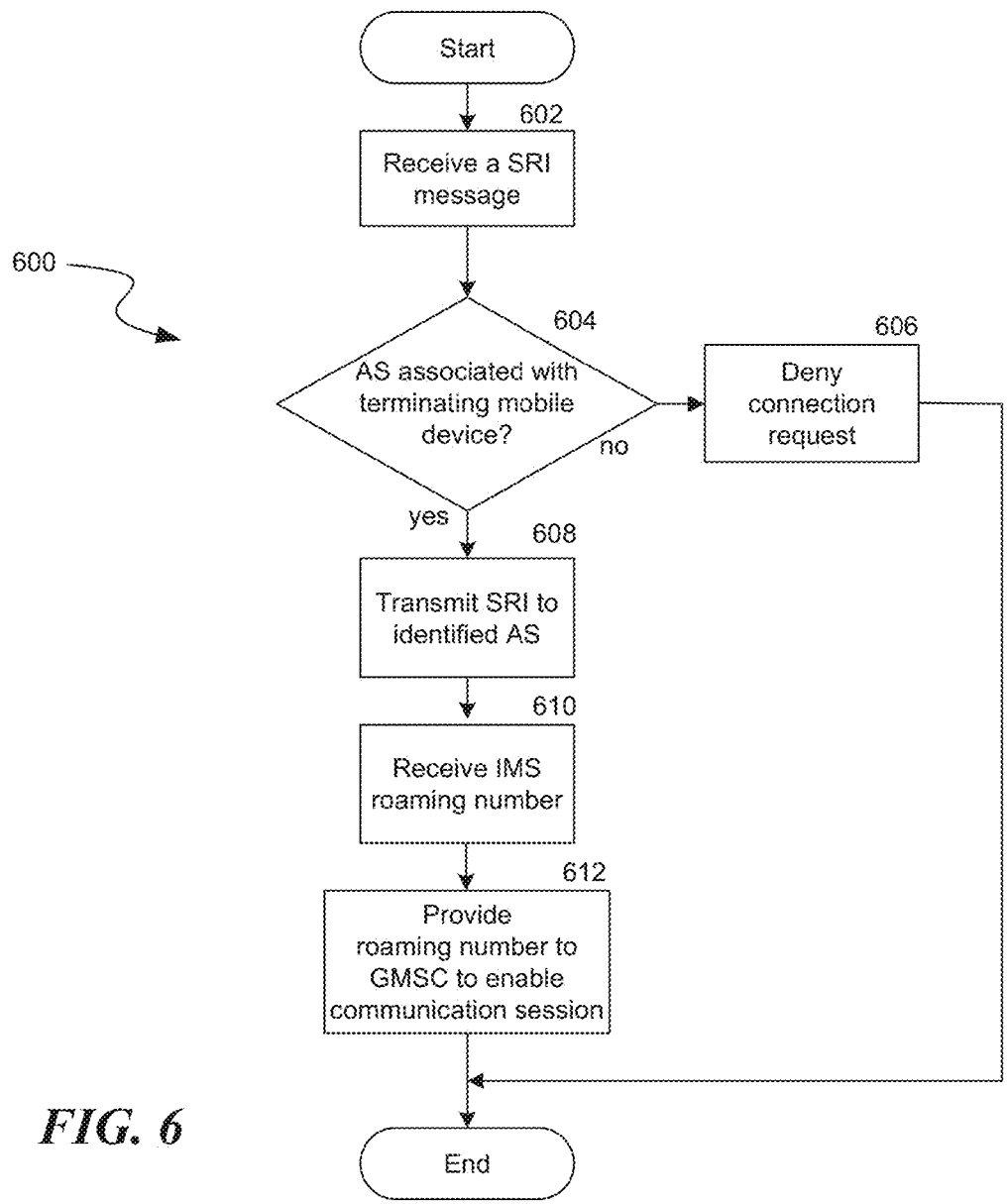
FIG. 6 is a flow chart that illustrates an exemplary method for authenticating, authorizing, and establishing a communication session with a mobile device having a registered IMS session in a visited network.

FIG. 6 is a flow chart that illustrates an exemplary method 600 implemented by the HLR 105 or HSS 125 for authenticating, authorizing, and establishing a communication session with a terminating mobile device having a registered IMS session in a visited network. At block 602 a SRI message is received by the HLR 105 or HSS 125 indicating a request to establish a communication session with a desired mobile device. The SRI is received from the GMSC 405. At decision block 604, the HLR 105 or HSS 125 determines whether the SRI message is associated with a mobile device that has a registered session with an application service 112 If the SRI message device is not authenticated by the HLR 105 or HSS 125 (i.e., if there is no application service associated with the mobile device), processing continues to a block 606 where the connection request is denied. Processing is then terminated. The requesting mobile device may be notified by the GMSC that a communication session cannot be established with the desired terminating mobile device.

If, however, an application service is associated with the mobile device at decision block 604, processing continues to a block 608. At block 608, the SRI is forwarded by the HLR/HSS to the associated application service. At block 610, the HLR or HSS receives an IMS roaming number that has been assigned to mobile device 106 by the AS. At block 612, the HLR/HSS provides the roaming number to the GMSC to allow a communication session to be established between a mobile device 106 and an IMS mobile device registered with an application service 112.

It will be apparent to those skilled in the art that various modifications and variations can be made in the system and method for non-IMS application service access over IMS disclosed herein. For example, the depicted flow charts may be altered in a variety of ways. The order of the steps may be rearranged, steps may be performed in parallel, steps may be omitted, or other steps may be included. As another example, the actual implementation of the database may take a variety of forms, and the term "database" is used herein in the generic sense to refer to any area that allows data to be stored in a structured and accessible fashion using such applications or constructs as databases, tables, linked lists, arrays, and so on. Thus, it is intended that the present invention cover the modifications and variations of this invention provided they come within the scope of the appended claims and their equivalents.

I claim:

1. A method in an Internet Protocol Multimedia Subsystem (IMS) network comprising:
   receiving, via the IMS network, a send routing information (SRI) message indicating a request to establish a communication session with a mobile device;
   determining whether the mobile device associated with the SRI message has a registered session with an application service;
   denying the connection request upon determining that the mobile device is not associated with the application service; and
   forwarding, via the IMS network, the SRI message to the application service upon determining that the mobile device is associated with the application service,
      wherein the SRI message is used by the application service to determine a roaming number that has been previously assigned to the mobile device by the application service.

2. The method of claim 1, wherein the roaming number is an IMS roaming number and the method further comprising:
   receiving the IMS roaming number from the application service; and
   transmitting the IMS roaming number to a gateway mobile switching center (GMSC) to establish the communication session with the mobile device.

3. The method of claim 1, wherein the application service includes telephony applications, e-commerce applications, mobile gaming applications, location-based service applications, or enterprise applications.

4. The method of claim 1, further comprising maintaining geographic information of the mobile device.

5. The method of claim 1, further comprising storing, upon initiation of the registered session, an address of the application service in conjunction with an identity of the mobile device.

6. The method of claim 1, further comprising determining, based on access rules, whether the mobile device can access the application service, wherein the access rules are based on outstanding account balance, conformance with a service plan, parental restriction, or features of the mobile device supported or not supported by the application service.

7. The method of claim 1, wherein the mobile device uses a uniform resource indicator (URI) to register an IMS session with a visited network.

8. A computer readable medium, excluding transitory signals, having instructions stored thereon that when executed by one or more processor in an Internet Protocol Multimedia (IMS) network cause a computing system to perform a method comprising:
   receiving, via the IMS network, a send routing information (SRI) message indicating a request to establish a communication session with a mobile device;
   determining whether the mobile device associated with the SRI message has a registered session with an application service;
   denying the connection request upon determining that the mobile device is not associated with the application service; and
   forwarding, via the IMS network, the SRI message to the application service upon determining that the mobile device is associated with the application service,
      wherein the SRI message is used by the application service to determine a roaming number that has been previously assigned to the mobile device by the application service.

9. The computer readable medium of claim 8, wherein the roaming number is an IMS roaming number and the instructions when executed by the one or more processor further cause the machine to:
   receive the IMS roaming number from the application service; and
   transmit the IMS roaming number to a gateway mobile switching center (GMSC) to establish the communication session with the mobile device.

10. The computer readable medium of claim 8, wherein the application services include telephony applications, e-commerce applications, mobile gaming applications, location-based service applications, or enterprise applications.

11. The computer readable medium of claim 8, wherein the instructions when executed by the one or more processor further cause the computing system to maintain geographic information of the mobile device.

12. The computer readable medium of claim 8, wherein the instructions when executed by the one or more processor further cause the computing system to store an address of the application service in conjunction with an identity of the mobile device.

13. The computer readable medium of claim 8, wherein the instructions when executed by the one or more processor further cause the computing system to determine, based on access rules, whether the mobile device can access the application service, wherein the access rules are based on outstanding account balance, conformance with a service plan, parental restriction, or features of the mobile device supported or not supported by the application service.

14. The computer readable medium of claim 8, wherein the mobile device uses a uniform resource indicator (URI) to register an IMS session with a visited network.

15. A computing system comprising:
   a memory for storing programmed instructions;
   a processor, coupled to the memory, and configured to execute the programmed instructions to perform operations in an Internet Protocol Multimedia (IMS) network including:
      receiving, via the IMS network, a send routing information (SRI) message indicating a request to establish a communication session with a mobile device;
      determining whether the mobile device associated with the SRI message has a registered session with an application service;
      denying the connection request upon determining that the mobile device is not associated with the application service; and
      forwarding, via the IMS network, the SRI message to the application service upon determining that the mobile device is associated with the application service,
         wherein the SRI message is used by the application service to determine a roaming number that has been previously assigned to the mobile device by the application service.

16. The computing system of claim 15, wherein the roaming number is an IMS roaming number and the system further comprising:
   a means for receiving the IMS roaming number from the application service; and a means for transmitting the IMS roaming number to a gateway mobile switching center (GMSC) to establish the communication session with the mobile device.

17. The computing system of claim 15, wherein the application service includes telephony applications, e-commerce applications, mobile gaming applications, location-based service applications, or enterprise applications.

18. The computing system of claim 15, further comprising a means for maintaining geographic information of the mobile device.

19. The computing system of claim 15, further comprising:
 a means for determining, based on access rules, whether the mobile device can access the application service, wherein the access rules are based on outstanding account balance, conformance with a service plan, parental restriction, or features of the mobile device supported or not supported by the application service; and
 a means for storing, upon initiation of the registered session, an address of the application service in conjunction with an identity of the mobile device.

20. The computing system of claim 15, further comprising a means for receiving an indication that the mobile device has a circuit-switched connection.

\* \* \* \* \*